US011630931B2

(12) United States Patent
Reiterer et al.

(10) Patent No.: US 11,630,931 B2
(45) Date of Patent: Apr. 18, 2023

(54) METHOD OF GENERATING AN OPERATION PROCEDURE FOR A SIMULATION OF A MECHATRONIC SYSTEM

(71) Applicant: Virtual Vehicle Research GmbH, Graz (AT)

(72) Inventors: Stefan Harald Reiterer, Ligist (AT); Martin Benedikt, Frohnleiten (AT)

(73) Assignee: Virtual Vehicle Research GmbH, Graz (AT)

( * ) Notice: Subject to any disclaimer, the term of this patent is extended or adjusted under 35 U.S.C. 154(b) by 107 days.

(21) Appl. No.: 16/948,126

(22) Filed: Sep. 3, 2020

(65) Prior Publication Data

US 2021/0081586 A1 Mar. 18, 2021

(30) Foreign Application Priority Data

Sep. 12, 2019 (EP) .................................... 19197037

(51) Int. Cl.
*G06F 30/23* (2020.01)
*G06T 17/20* (2006.01)
(Continued)

(52) U.S. Cl.
CPC .............. *G06F 30/23* (2020.01); *G06T 17/20* (2013.01); *G06F 30/25* (2020.01); *G06F 30/367* (2020.01);
(Continued)

(58) Field of Classification Search
CPC ...... G06F 16/9024; G06F 30/20; G06F 30/23; G06F 30/39; G06F 30/25; G06F 30/367;
(Continued)

(56) References Cited

U.S. PATENT DOCUMENTS

2006/0158372 A1* 7/2006 Heine .................... G01S 19/07
342/357.44
2011/0231168 A1* 9/2011 Grossard ................ G06F 30/00
703/2
(Continued)

FOREIGN PATENT DOCUMENTS

| JP | 2004220577 A | 8/2004 |
| WO | 2011016327 A1 | 2/2011 |
| WO | 2013099438 A1 | 7/2013 |

OTHER PUBLICATIONS

R. G. Longoria, "Modeling of Mechanical Systems for Mechatronic Applications" pp. 1-54, The University of Texas at Austin (Year: 2002).*

(Continued)

*Primary Examiner* — Kibrom K Gebresilassie
(74) *Attorney, Agent, or Firm* — Robert A. Blaha; Smith Tempel Blaha LLC

(57) ABSTRACT

A computer-implemented method of generating an operation procedure for a simulation of a system, in particular a mechatronic system is disclosed. A source node has at least one source parameter (Ps) and a first simulation system with at least one first simulation node is determined, wherein the first simulation node includes at least one input parameter (Pi) and at least one output parameter (Pa). The first simulation node includes a simulation function for determining the output parameter (Pa) based on the input parameter (Pi) of the first node. When the input parameter (Pi) is available based on the source parameter (Ps), a global operation graph is built describing a link between the source node and the first simulation node for describing an operating procedure of the simulation of the system.

7 Claims, 4 Drawing Sheets

(51) Int. Cl.
*G06F 30/367* (2020.01)
*G06F 119/22* (2020.01)
*G06F 30/25* (2020.01)
*G06F 111/00* (2020.01)
*G06F 30/398* (2020.01)

(52) U.S. Cl.
CPC ........ *G06F 30/398* (2020.01); *G06F 2111/00* (2020.01); *G06F 2119/22* (2020.01)

(58) Field of Classification Search
CPC .............. G06F 30/398; G06F 2111/00; G06F 2119/22; G06N 5/003; G06T 17/20
See application file for complete search history.

(56) References Cited

U.S. PATENT DOCUMENTS

| | | | | |
|---|---|---|---|---|
| 2012/0265324 | A1* | 10/2012 | Colombo | G05B 19/4188 700/95 |
| 2014/0172826 | A1* | 6/2014 | Hoffmann | G06F 16/26 707/722 |
| 2015/0302640 | A1* | 10/2015 | Martinez Canedo | G06F 30/20 345/420 |
| 2016/0283849 | A1* | 9/2016 | Kozloski | G06N 5/043 |
| 2018/0137155 | A1* | 5/2018 | Majumdar | G06F 16/9024 |
| 2018/0365353 | A1 | 12/2018 | Devereux | |
| 2020/0090085 | A1* | 3/2020 | Martinez Canedo | G06F 16/9024 |
| 2020/0193323 | A1* | 6/2020 | Alesiani | G06K 9/6223 |
| 2021/0049467 | A1* | 2/2021 | Riedmiller | G06N 3/0445 |
| 2021/0069905 | A1* | 3/2021 | Zhang | G05B 19/425 |
| 2021/0073287 | A1* | 3/2021 | Hunter | H04L 67/26 |

OTHER PUBLICATIONS

MSC Software: "Integrating SimManager with CAE Tools for Higher Productivity", YouTube, May 12, 2014 (May 12, 2014), XP054980189, Retrieved from the Internet: https://www.youtube.com/watch?v=nwD0WqV82NY (See page 2 of NPL 7).

MSC Software: "Traceability of Complex Simulation Processes with SimManager", YouTube, May 27, 2015 (May 27, 2015), XP054980188, Retrieved from the Internet: https://www.youtube.com/watch?v=kzCtszbOlxY (See p. 2 of NPL7).

MSC Software: "Webinar-Introducing SimManager 2018.1", YouTube, Mar. 22, 2019 (Mar. 22, 2019), XP054980193, Retrieved from the Internet: https://www.youtube.com/watch?v=pVP-h6j4EBo (See p. 3 of NPL7).

Friedler F. et al.; "Combinatorial algorithms for process synthesis" European Symposium on Computer Aided Process Engineering; Computers & Chemical Engineering, vol. 16; Supplement 1, May 1992, pp. S313-S320.

Krammer, M. et al.; "The distributed co-simulation protocol for the integration of real-time systems and simulation environments."; In Proceedings of the 50th Computer Simulation Conference, p. 1. Society for Modeling & Simulation International (SCS), Jul. 9-12, 2018; Bordeaux, France.

Rodrigues, M.R. et al.; "A graph-based approach for designing extensible pipelines."; BMC bioinformatics, 13 (1):163, 2012.

Rungger, M.; Extended European Search Report in Application No. 19197037.5; European Patent Office; Feb. 27, 2020; pp. 1-15; 80298; Munich, Germany.

Kaneda, T.; Notice of Reasons for Refusal in Application No. 220-153294; pp. 1-3; Sep. 7, 2021; Japan Patent Office; 3-4-3 Kasumigaseki, Chiyoda-ku Tokyo 100-8915, Japan.

English translation of Notice of Reasons for Refusal in Application No. 2020-153294; pp. 1-4; Sep. 7, 2021 Japan Patent Office; 3-4-3 Kasumigaseki, Chiyoda-ku Tokyo 100-8915, Japan.

\* cited by examiner

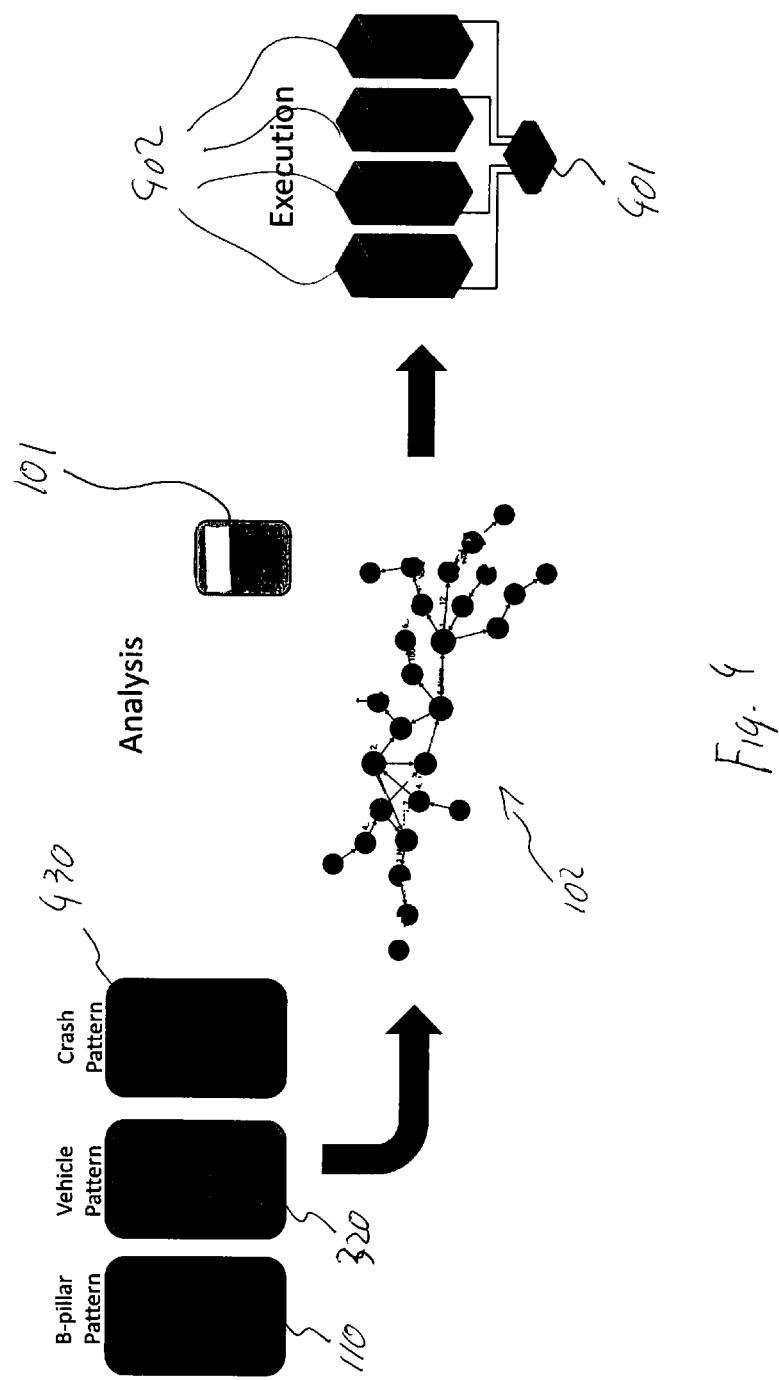

METHOD OF GENERATING AN OPERATION PROCEDURE FOR A SIMULATION OF A MECHATRONIC SYSTEM

CROSS-REFERENCE TO RELATED APPLICATIONS

The present application claims priority to European Patent Application No. 19 197 037.5 filed Sep. 12, 2019, the entire contents of which is incorporated herein by reference in its entirety.

TECHNICAL FIELD

The present invention relates to a computer-implemented method of generating an operation procedure for a simulation of a system, in particular a mechatronic system. Furthermore, the present invention relates to a system of generating an operation procedure for a simulation of a mechatronic system.

TECHNOLOGICAL BACKGROUND

In the design procedures of complex mechanical systems, such as an automobile, a plurality of different design simulations and functional test simulations have to be conducted. All of the different simulation proceedings can be conducted parallel only if sufficient input data for the respective simulation proceedings are available. Most of the design processes, the design simulation and functional test have to be conducted in a serial manner, because simulation data from a preceding simulation have first to be calculated and determined before being available for a subsequent simulation. From another perspective, the increasing amount of simulation automation for implementing continuous testing requires the automatic linkage of functions and their related simulations for execution of overall functional test. For example, before conducting a FEM simulation or a crash simulation of a vehicle model, the individual parts of the vehicle, such as a car door for a dedicated B-pillar of the vehicle, have to be designed and simulated. Furthermore, after conducting the FEM simulation of the vehicle model, the results of the FEM simulation may have to be considered again in the simulation procedure of the individual parts. Because no interaction between the plurality of different design simulation and functional tests it is difficult to conduct parallel simulation and test proceedings between different design and test departments.

For example, according to the example described above, at the beginning for example three types of simulation have to be conducted. First of all, CAD (computer aided design) data are made for a free form metal sheet part (e.g. a car door). Next, a parametrization and simulation of the production of this part can be conducted. Furthermore, the next step, a FEM crash simulation is conducted to check the crash behavior of the part in the car. In a classical setting three workflows of the three types of simulation would have be done sequentially where possible. Automation steps would be done handmade by specialized programmers. The different transformations steps are performed by programmers which write scripts for the intermediate steps. There are several steps which have to be done inside the simulation workflows. First of all, data, such as CAD sketches and Material Data (e.g. stress-strain curves), have to be collected. Next, CAD parameters are adjusted on the basis of a respective input data. Next, a preprocessing step of the models are conducted and simulation units are built. Next, the simulation is ready to run.

However, there are several problems with the above described classical approach. First of all, an automation of the intermediate steps needs time and human specialists of distinct fields (IT and simulation) for realization of the transformation steps which are necessary between two simulation procedures that should run in parallel. Furthermore, there is no complete overview how the different steps of different simulation proceedings can be connected. Furthermore, in practice, the data, e.g. certain mechanical parameters, in the different simulation proceedings may be provided in different versions or units. Additionally, the different simulation proceedings may use different simulation software which are not comfortable with respect to each other.

Summarizing, an interaction between different data sources and simulation proceedings is complicated and human interaction in order to combine different simulation proceedings is necessary. Hence, complex simulations are time-consuming and needs huge hardware resources. Specifically, complex mechatronic systems, such as automobiles, cannot be conducted by a general simulation tool because the necessary hardware resources may be not available.

SUMMARY

There may be a need to provide a simulation system and simulation proceeding which combines all necessary simulation proceedings of a mechatronic system to be simulated in a hardware resource saving manner.

According to first aspect of the present invention, there is provided a computer-implemented method of generating an operation procedure for a simulation of a system, in particular a mechatronic system. According to the method, a source node comprising at least one source parameter is determined. Furthermore, a (at least one) first simulation system comprising at least one first simulation node, is determined, wherein the first simulation node comprises at least one input parameter and at least one output (target) parameter. The first simulation node comprises a simulation function for determining the output parameter on the basis of the input parameter of the first node. According to the method, it is further determined, if the input parameter is available on the basis of the source parameter. If the input parameter is available on the basis of the source parameter, a global operation graph is built describing a link between the source node and the first simulation node for describing an operating procedure of the simulation of the system.

OVERVIEW OF EMBODIMENTS

An above described simulation system describes for example a simulation for a mechatronic system, e.g. a mechanical part, such as a car door or any other mechanical part, an electromechanical part, a control software for controlling an electromechanical part, or a test procedure of the mechanical part, such as a forming simulation of the mechanical part. A mechatronic system comprises e.g. mechanical, electrical, electromechanical or software modules of a component to be simulated. The simulation system comprises one or a plurality of data source units and one or a plurality of functional units which simulate and calculate, respectively, on the basis of one or a plurality of input parameters the desired output parameter(s).

Specifically, one of the functional units may be defined as the above described simulation node which determined the desired output parameter on the basis of the one or a plurality of input parameters.

The source node comprises at least one source parameter. The source parameter may be taken from a database or from another simulation system, as described below in further detail. Furthermore, the source parameter may comprise the information about the necessary input parameter of the first simulation node or may at least deliver an information about how the input parameter can be determined on the basis of the source parameter. For example, as described below, several intermediate calculations and simulations on the basis of the output parameter can be conducted in order to achieve the input parameter.

The output parameter describes the result of a simulation of the simulation node. The output parameter may be for example a single physical parameter, such as a temperature, a E-Modulus or a material parameter. Furthermore, the output parameter may describe a dataset of a resulting simulation model, such as a result of a deformation test, a result of a FEM analyses or a dynamic vehicle test.

The input parameter describes the necessary information for conducting the simulation in the simulation node. The input parameter may be for example a single physical parameter, such as a temperature, an E-Modulus or a material parameter. Furthermore, the input parameter may describe a dataset required function or pre conducted simulation result which is necessary for simulating the simulation in the simulating node, such as a result of a deformation test, a result of a FEM analyses or a dynamic vehicle test.

According to the method, it can be determined, if the input parameter is in principle available on the basis of the source parameter. For example, in the first simulation, it is known, that the necessary input parameter is stored in a database forming the source node. In another case, the source parameter contains physical units which differ to the necessary physical units of the input parameter. Hence, the conversion between the units can be conducted in order to provide the input parameter. The further case, it is known that in another simulation procedure, the source parameter forming the necessary input parameter have already been calculated and simulated. Hence, the input parameter can be taken from the other simulation procedure.

Respective information can be achieved by a general routine combining all information of the one or the plurality of simulation systems and databases. However, according to the approach of the present invention, this general routine has to be conducted only once. After conducting the general routine once, all interactions between the source nodes and the simulation nodes are available.

All interactions between the several source nodes and simulation nodes are mapped in the global operation graph. Hence, according to the present invention, a global operation graph is built and describes a link between the source node and the first simulation node describing an operation procedure of the simulation of the system. Specifically, by the global operation graph, a plurality of interactions between source nodes and respective simulation nodes of the plurality of databases and simulation systems can be mapped.

Hence, according to a further exemplary embodiment of the invention, a simulation system is controlled e.g. by a control unit on the basis of the global operation graph for performing the simulation of the system. In other words, the global operation graph provides a map and a necessary path of interaction between at least one simulation system with a further external source node. Hence, for an iteration of the operating procedure for simulation of the system, the subsequent steps of conducting the simulation can strictly follow the path of the global operation graph. It is not necessary to determined again all interactions between different simulation systems and data sources. Hence, requirements for hardware resources can be reduced. This has also the effect, that more complex real-life physical systems can be simulated without needing more hardware resources. Accordingly, by determining the global operation graph once, the simulation time for an iteration of the simulation of the system can be reduced. Hence, considering the increasing amount of simulation automation for implementing continuous testing requires by the global operation graph the automatic linkage of functions and their related simulations for execution of overall functional test is prescribed.

According to further exemplary embodiment, the source node comprises a database comprising the source parameter. For example, a plurality of material parameters may be stored in a databases function as a source node. Hence, if an input parameter should identify the specific material or material characteristics, such as ductility or heat resistance, a respective input parameter describing for example the ductility of the second material, can be taken from the source parameter of the source node. This respective link is mapped in the global operation graph.

According to further exemplary embodiment, the source node comprises a simulation function for determining the source parameter on the basis of the source input parameter of the source node. Hence, for example it is known that the source parameter which can be used as an input parameter for the simulation can be calculated on the basis of one or a plurality of source input parameters. Hence, the source node may comprise a source function for simulating and calculating the output parameter.

The source function can be taken from a repository unit in which a plurality of sub program tools for calculating desired output parameters on the basis of respective input parameters are stored. The respective link to the repository unit and the respective subprogram tool is mapped in the global operation graph.

According to further exemplary embodiment, a second simulation system is determined. The second simulation system comprises a second source node. Hence, by the exemplary embodiment it is outlined, that a link between a plurality of simulation systems can be mapped the global operation graph. For example, if the second simulation system has determined already respective source parameter in a respective source node of the second simulation system, the source parameter can be taken as input parameter for the simulation node of the first simulation system. This respective link is stored in the global operation graph.

For example, the first simulation system describes the design and simulation of a B-pillar of a vehicle and the second simulation system describes a dynamic vehicle test. The second simulation system comprises already a comprehensive vehicle model of the vehicle including for example the material of the framework of the vehicle. Because the B-pillar is determined as a part of the framework of the vehicle, the second simulation system is already the information about the material of the B-pillar. Hence, in the first simulation system it is no longer necessary to conduct again the further step of determining the material parameter of the B-pillar since this information can already be received by the source node containing information of the material parameter of the B-pillar in the second simulation system. This link is stored in the global operation graph so that an automatic interdiction is provided.

According to further exemplary embodiment, the second source node is a second simulation node of the second simulation system, wherein the second simulation node comprises at least one further input parameter and at least one further output parameter. The second simulation node comprises a further simulation function for determining the further output parameter indicative of the source parameter on the basis of the further input parameter of the first node. Hence, not only the first simulation system but also the second and or further moderation system may comprise respective simulation nodes which can receive respective further parameters on the basis of several source parameters being received from databases or other source nodes of other simulation systems.

According to a further exemplary embodiment a converting unit is provided, configured for converting the source parameter of the source node to the input parameter of the simulation node. Hence, the source parameter can be available by a different program version which differs to a program version of the program of the simulation node. Furthermore, the source parameter can be available in a respective unit (e.g. feeds) which differs to the unit of the input parameter (e.g. cm, centimeters). Hence, the converting unit converts the source parameter to a desired quality (unit or program version etc.) of the input parameter.

Accordingly, according to a further exemplary embodiment, the converting unit transfers the source parameter to the input parameter by converting a format (unit, communication protocol or program version etc.) of the source parameter to a required format of the input parameter.

According to further exemplary embodiment, the converting unit provides a transfer function for determining the input parameter on the basis of the source parameter and in particular of a further source parameter. The converting unit may comprise a plurality of transfer functions which describe intermediate program tools (e.g. Gateway patterns) which conducts the converting action. This link is mapped in the global operation graph. Hence, since it is mapped which converting program tools are required and available, the selection of the necessary converting program to a be conducted automatically on the basis of the available source parameter and the desired input parameter. It is not necessary to program a new converting program for a specific procedure of the simulation.

According to further exemplary embodiment, a system of generating an operation procedure for a simulation of a system, in particular a mechatronic system, is provided comprising a processor configured to perform the steps of the above described method.

According to further exemplary embodiment, a computer program product is provided comprising instructions which, when the program is executed by a computer, cause the computer to carry out the steps of the above described method.

The program product may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The program product may be available from a network, such as the World Wide Web, from which it may be downloaded. The invention may be realized by means of a computer program product respectively software. However, the invention may also be realized by means of one or more specific electronic circuits respectively hardware. Furthermore, the invention may also be realized in a hybrid form, i.e. in a combination of software modules and hardware modules.

Summarizing, by building the global operation graph, a simulation step which is similar or a plurality of different simulation systems can be conducted only once, since it is known when the respective simulation step or the necessary source parameter is determined or calculated for the first time. Therefore, it is also possible, to the reschedule the performance of the simulation nodes of the different simulation systems in order to optimize the operation procedure of the simulation of the system. Hence, by the global operation graph all dependencies and all executed transformations are mapped. As postprocess action the order in the global operation graph can be optimized to provide a better usage of computational resources.

The approach of the present invention, in particular the building of the global operation graph, allows for parameter studies of complex test setups and chained test procedures, by autogenerating for different input parameter sets of source nodes which can be dynamically reconstructed at any time to react to changes in results and provide the user with feedback or trigger new arrangement of simulation nodes and source nodes and test setups, respectively.

Due to the design of the global operation it is possible to analyze the underlying communication protocols and enable automatic generation and deployment of suitable communication gateways between different simulation systems. Since communication can be interpreted as a transformation of one signal (source parameter) into another (input parameter), the global operation graph can illustrate suitable connections in the graph to connect a start node (source node) to a target node (simulation node) and reconstruct the necessary transformation steps. Thus, from a collection of transformations from one signal (source parameter) into another (input parameter) a suitable gateway (e.g. an intermediate program tool) can be automatically constructed by joining the provided communication gateways.

Since the global operation graph illustrates kind of metadata itself it is possible to provide missing information to successor (simulation) nodes.

The proposed computer implemented method describing algorithms and data structure can be used for connected test environments (simulation systems) which consists of simulation tools and respective hardware. The resulting possibilities to interactively and dynamically change, build and execution of processes mapped in the global operation graph lead a variety of improvements for integrated hardware a simulation of complex mechatronic systems, such as in vehicles systems.

For example, the reliability of the results of the simulation is improved by better evaluating the quality of the performed tests on the basis of the operation graph. Specifically, improvement of performance can be achieved by automatically generating, evaluating and performing complex parameter tests mapped by the global operation graph. Furthermore, the communication time of connected components, such as the plurality of simulation systems, for example by simulating a mechatronic system such as components inside a car can be improved by tracking and analyzing the structure of the communication between hardware and software parts and enable automatic optimization on the basis of the global operation graph which also describes available algorithms due to the nature of the mapping of the several links between source nodes and simulation nodes.

Furthermore, by the global operation graph a dynamically chaining of complex build, communication and deployment processes for software of connected hardware components can be enabled. Hence, a faster and safer execution of complex simulation systems mapping complex chains in the global operation graph is enabled.

Specifically, by the global operation graph missing information and source parameters between those nodes and simulation nodes become obvious.

By providing the global operation graph as a process-graph model of the different simulation cycles it is possible to provide templates for the simulation developers which can easily be filled and connected for example in a simple graphical user interface (democratization of development of dynamic build simulations). By the global operation graph the connection between different simulations can be visualized and/or modelled and outputs can be connected to chain the different simulations. The process-graph can be versioned and stored in a graph database. The structure of the global operation graph is modular and different simulation systems and/or new simulation steps of simulation system can be added to the global operation graph automatically, since transformation (i.e. conversion or source) nodes with the same input and output parameters can be easily exchanged.

Furthermore, by the global operation graph a decision tree is provided which can be used to chain different simulation nodes depending on the results, i.e. the parameter of a simulation node.

Furthermore, in the setting with process-graph model, e.g. in the mapping of the global operation graph, the developers can now fill in calls they would execute on their local machines to automatically generate the global operation graph which start the operating procedure of the simulation of the system and simply check in their development state and change source parameters, without the need of specialized IT personal to rewrite the build and deployment global operation graph. After all data (input parameters, source parameters) is checked in the simulations, they are triggered automatically in the correct order by the global operation graph which is computed before by a process-graph unit.

For example, first the CAD data would be prepared for the forming simulation (first simulation system) which uses the input data provided by the production engineers (source node). Then, the resulting part of the forming simulation which has already simulated e.g. by a pre-stress simulation (source node) of the forming process (first simulation system) can be directly used in the crash simulation (second simulation system) which starts after all metal parts (provided by several source nodes of other forming simulations) are collected.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

FIG. 4 shows a schematic view of an overall procedure of simulating a system according to an exemplary embodiment of the present invention.

DETAILED DESCRIPTION OF ILLUSTRATED EMBODIMENTS

Figure 1:
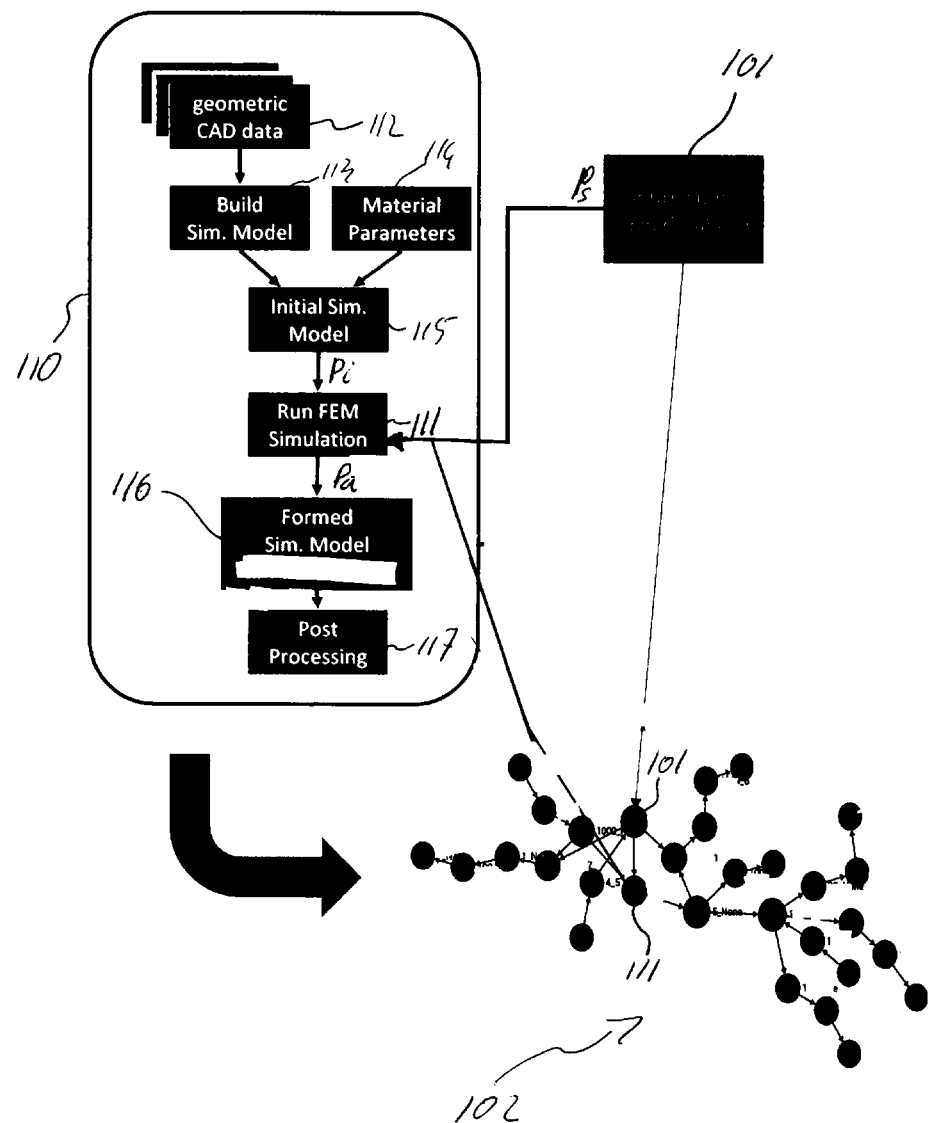
FIG. 1 shows a schematic view of a computer-implemented method of generating an operation procedure for a simulation of the system according to an exemplary of the present invention.

The illustrations in the drawings are schematically presented. In different drawings, similar or identical elements are provided with the same reference signs.

FIG. 1 shows a schematic view of a computer implemented method of generating an operation procedure for a simulation of the system according to an exemplary of the present invention.

A source node 101 comprising at least one source parameter Ps is determined. Furthermore, a (at least one) first simulation system 110 comprising at least one first simulation node 111 is determined, wherein the first simulation node 111 comprises at least one input parameter Pi and at least one output (target) parameter Pa. The first simulation node 111 comprises a simulation function for determining the output parameter Pa on the basis of the input parameter Pi of the first node. According to the method, it is further determined, if the input parameter Pi is available on the basis of the source parameter Ps. If the input parameter Pi is available on the basis of the source parameter Ps, a global operation graph 102 is built describing a link between the source node 101 and the first simulation node 111 for describing an operating procedure of the simulation of the system.

In the exemplary embodiment shown in FIG. 1 the first simulation system 110 describes for example a simulation of a mechanical part, such as a car door, for example. First, geometric CAD data 112 are provided. On the basis of the CAD data 112, a simulation model of the mechanical part is built 113 (e.g. by automatically establishing the Finite Element mesh on the basis of the input CAD data). Together with material parameters 114 of the mechanical part, an initial simulation model 115 is defined. This initial simulation model 115 represents the input parameter Pi to the FEM simulation node 111. Next, a (e.g. FEM) simulation 111 is conducted.

The initial simulation model 115 provides the first input parameter Pi which is necessary for running the (e.g. FEM) simulation in the simulation node 111. Additionally, further input parameter Pi, such as material stress characteristics of the mechanical part, have to be derived from the source node 101 which may be in the exemplary embodiment in FIG. 1 a database. Together with other necessary input parameters Pi, the simulation of the simulation node 111 may be conducted. The achieved output parameter Pa or simulation results in general, such as the formed simulation model 116 of the mechanical part (including all information about the FEM simulation and the updated stress characteristics of the mechanical part) can be provided for subsequent postprocessing procedures 117.

It can be determined, if the input parameter Pi is in principle available on the basis of the source parameter Ps. For example, in the first simulation system 110, it is known, that one necessary input parameter Pi, such as the material stress characteristics of the mechanical part, is stored in a database forming the source node 101. For example, a plurality of material parameters may be stored in a database function as a source node 101. Hence, if an input parameter Pi should identify the specific material or material characteristics, such as material stress characteristics, ductility or heat resistance, a respective input parameter Pi describing for example the ductility of the material, can be taken from the source parameter Ps of the source node 101. This respective link is mapped in the global operation graph 102 as can be taken from FIG. 1.

Respective information can be achieved by a general routine combining all information of the one or the plurality of simulation systems 110 and databases. However, according to the approach of the present invention, this general routine has to be conducted only once. After conducting the general routine once, all interactions between the source nodes 101 and the simulation nodes 110 are available and mapped in the global operation graph 102. Hence, a global operation graph 102 is built and describes a link between the source node 101 and the first simulation node 111 describing an operation procedure of the simulation of the system. Specifically, by the global operation graph 102, a plurality of interactions between source nodes 101 and respective simulation nodes 111 of the plurality of databases and simulation systems can be mapped.

As can be taken from FIG. 1, the global operation graph 102 shows the plurality of simulation nodes 111 and source nodes 101 together with their dependencies and interactions. Hence, by conducting the simulation of the system to be simulated, the path through the global operation graph 102 can be followed so that clear instructions about the procedure and schedule of conducting one node after the other.

Figure 2:
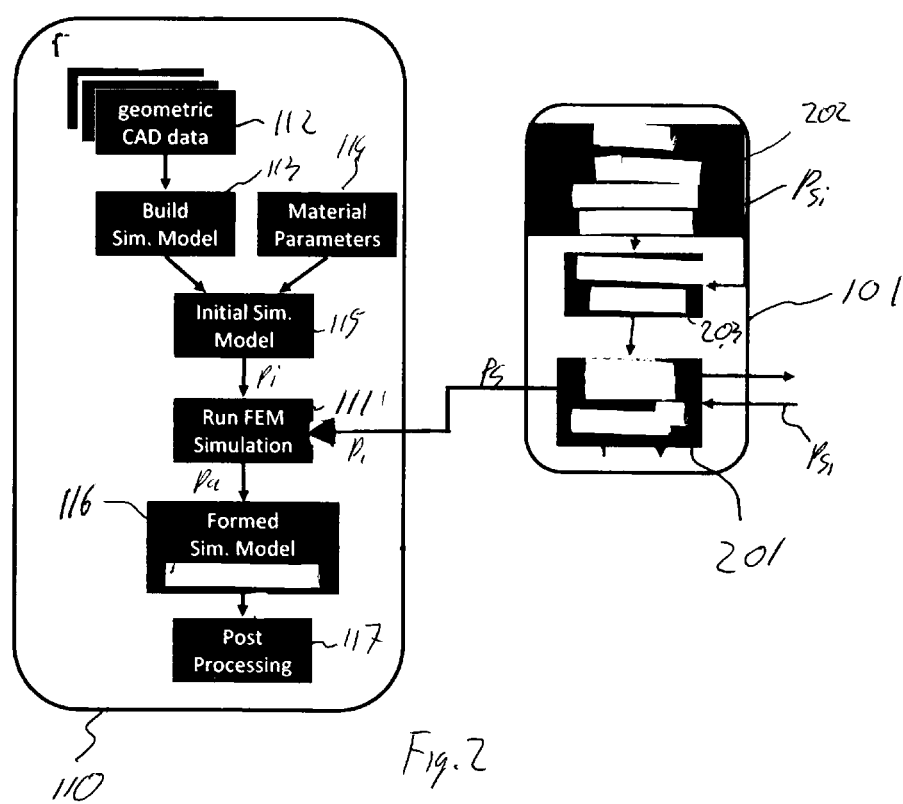
FIG. 2 shows a schematic view of a computer-implemented method showing a converting unit and a simulation function according to an exemplary embodiment of the present invention.

FIG. 2 shows a schematic view of a computer implemented method showing a converting unit (a simulation function) 201 according to an exemplary embodiment of the present invention. The source node 101 comprises a simulation function 201 for determining the source parameter Ps on the basis of source input parameter Psi of the source node 101. Hence, for example it is known that the source parameter Ps, which can be used as an input parameter Pi for the simulation node 111, can be calculated on the basis of one or a plurality of source input parameters Psi. Hence, the source node 101 may comprise a source function 201 for simulating and calculating the output parameter Ps.

The source function 201 can be taken from a repository unit or a functional source 202 in which a plurality of sub program tools for calculating desired output parameters on the basis of respective source input parameters Psi are stored. The respective link to the repository unit 202 and the respective subprogram tool is mapped in the global operation graph 102. Furthermore, on the basis of the functional source 202 respective simulation functions may be built 203.

Furthermore, the source parameter Ps may comprise the information about the necessary input parameter Pi of the first simulation node 111 or may at least deliver an information about how the input parameter Pi can be determined on the basis of the source parameter Ps. For example, several intermediate calculations and simulations on the basis of the output parameter Ps can be conducted in order to achieve the input parameter Pi.

Furthermore, a converting unit 201 may be provided, configured for converting the source parameter Ps of the source node 101 to the input parameter Pi of the simulation node 111. For example, the converting unit 201 transfers the source parameter Ps to the input parameter Pi by converting a format (unit or program version etc.) of the source parameter to a required format of the input parameter.

According to further exemplary embodiment, the converting unit 201 provides a transfer function for determining the input parameter Pi on the basis of the source parameter Ps and in particular of a further source parameter Ps. The converting unit 201 may comprise a plurality of transfer functions which describe intermediate program tools (e.g. Gateway patterns) stored in the functional source unit 202, wherein the intermediate program tools conduct the converting action. This link is mapped in the global operation graph 102. Hence, since it is mapped which converting program tools are required and available, the selection of the necessary converting program to a be conducted automatically on the basis of the available source parameters Ps and the desired input parameter Pi. It is not necessary to program a new converting program for a specific procedure of the simulation.

Figure 3:
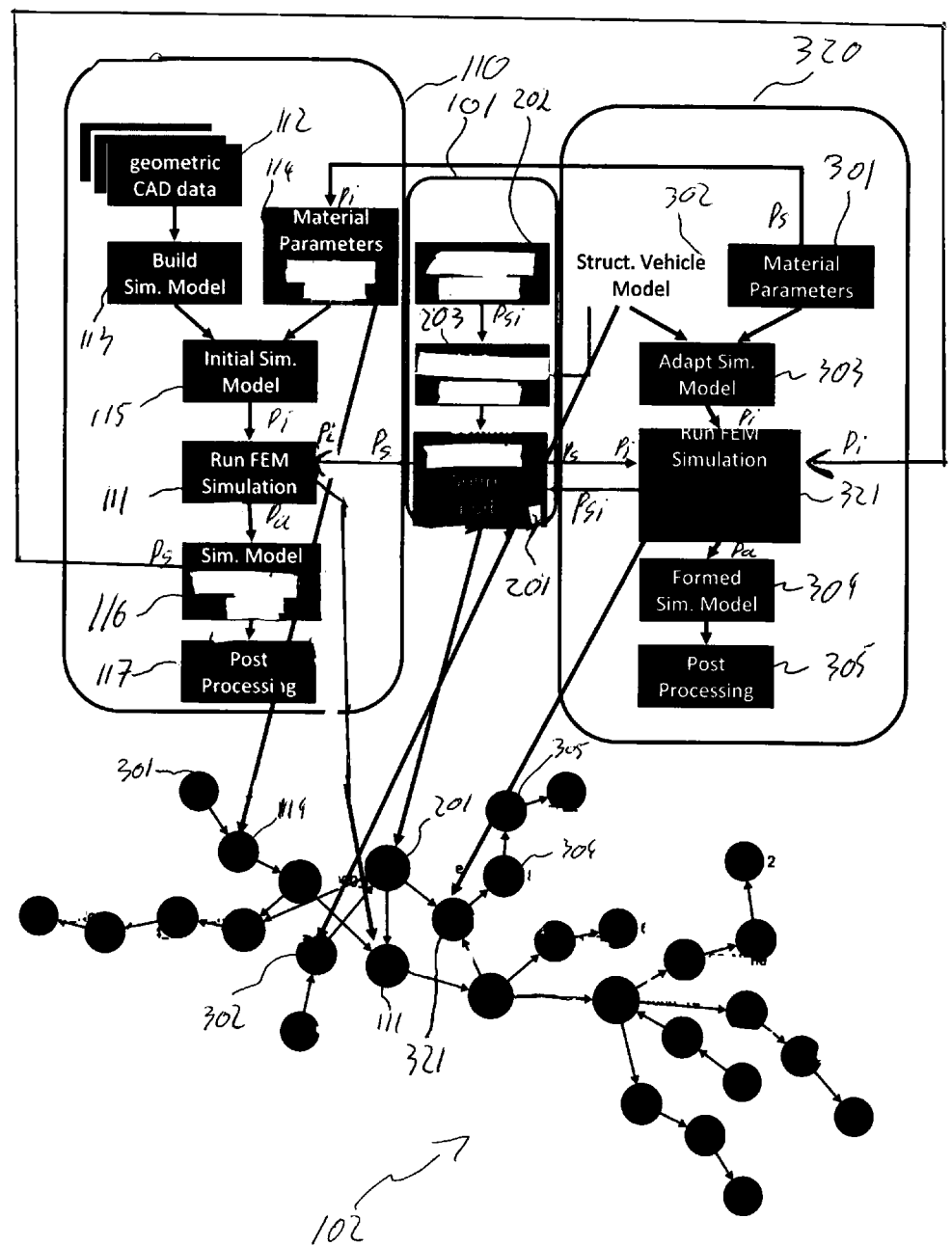
FIG. 3 shows a schematic view of the computer-implemented method showing a plurality of simulation systems and a source node according to an exemplary embodiment of the present invention.

FIG. 3 shows a schematic view of the computer implemented method showing a plurality of simulation systems 110, 320 and a source node 101 according to the exemplary embodiment of the present invention.

In the exemplary embodiment shown in FIG. 3, a second simulation system 320 is further determined. The second simulation system 320 describes for example an FEM simulation of a structural vehicle model 302, wherein in the vehicle, the mechanical part, such as a vehicle door, is built in. The mechanical part is simulated for example in the first simulation system 110. According to the second simulation system 320, data of the structural vehicle model 302 and respective material parameters 301 are provided. Next, a simulation model 303 of the structural vehicle model is generated. Next, in the simulation node 321, in which further input parameter Pi are necessary, a FEM simulation is conducted.

The simulation node 321 receives input parameters Pi from the adapted simulation model 303 of the vehicle. Additionally, further input parameter Pi are taking from the source node 201 which provides respective source parameters Ps.

The source node 101 may for example also provide the converting unit 201 and simulation function, respectively, as shown in FIG. 2 or a database as shown in FIG. 1. The basis of the input parameters Pi based on output parameters Pa are determined in the FEM simulation node 321. Based on the output parameters Pa, a formed simulation model 304 of the vehicle can be accessed. Next, further post processing steps 305 can be conducted.

Furthermore, the converting unit 201 may also provide specific source parameters Ps which are necessary as input parameters Pi for the simulation node 111 of the first simulation system 110.

Additionally, the second simulation system 320 may comprise a further source node 301, data mining for example specific material parameters. The further source node 301 may provide source parameters Ps which may be used as input parameters Pi in a further simulation node or in further data sources 114 of the first simulation system 110. Hence, it is not necessary to collect and determine the material parameters 114 again, since the material parameters 301 have been already collected and determined for the second simulation system 320.

Furthermore, the first simulation system 110 and the second simulation system 320 may be conducted simultaneously. As can be taken from FIG. 3, the second simulation system 320 provides a source input parameter Psi for the source node 201. As described above, the source node 201 determines a respective source parameter Ps (Pi) for the simulation node 111 of the first simulation system 110. Furthermore, the simulation node 111 determines a simulation model 116 which is defined by several output parameters Pa. From the simulation model 116 and/or from the simulation node 111, respectively, a further source parameter Ps can be taken which functions as an input parameter of the simulation node 321 of the second simulation system 320. Hence, a respective dependency and co-simulation of both simulation systems 110, 320 is provided and mapped in the global operation graph 102.

In other words, one simulation system 110, 320 comprises a respective source node 111, 116, 201, 321 for the other simulation system 320, 110. Hence, a bi-directional exchange of necessary source parameters Ps, Psi can be provided.

Furthermore, the first simulation system 110 and the second simulation system 320 may run simultaneously and an exchange of the necessary source parameters Ps, Psi is provided during a respective simultaneous runtime of the simulation systems 110, 320. For example, if the result of the simulation model 116 shows that a strength of a certain material parameter is too low, the value of the parameter "thickness of simulated part (e.g. a B-pillar of a car)" can be increased and used as a source parameter, Ps, and an input parameter Pi, respectively, in the second simulation node 321, simulated for example the overall mechatronic system, such as the car containing the B-pillar simulated in the first simulation system 110. However, if the results of the second simulation node 321 and the formed simulation model 304, respectively, shows that due to the increased thickness of the part simulated in the first simulation system 110, the overall weight requirements are mismatched, a respective source input parameter Psi describing the weight information is given to the simulation function 201 of the source node 101. In the simulation function 201 a program tool may amend the weight for example by amending the source parameter "kind of material for B-pillar" or again the parameter "thickness" by which the respective weight characteristics can be met. This amended source parameter Ps is given as an input parameter Pi again to the first simulation node 111 in order to simulate a further simulation model 116. Again, the amended further simulation model 116 is again used as an input parameter Pi in the second simulation node 321.

Hence, both simulation systems 110, 320 run simultaneously, until each simulation model 116, 304 fulfills its respective requirements determined for each simulation model of the first and second simulation systems 110, 320.

A link between a plurality of simulation systems 110, 320 is mapped in the global operation graph 102. For example, if the second simulation system 320 has determined already respective source parameter Ps in a respective source node 301 of the second simulation system 320, the source parameter Ps can be taken as input parameter Pi for the simulation node of the first simulation system 110. This respective link is stored in the global operation graph 102.

FIG. 4 shows a schematic view of an overall procedure of simulating a system according to an exemplary embodiment of the present invention.

First of all, respective simulation systems 110, 320, 430 are determined. For example, the first simulation system 110 describes a simulation of a B-pillar of a vehicle, the second simulation system 320 describes a simulation of the complete vehicle and the third simulation system 430 describes for example the crash simulation of the vehicle. Next, in an initial process analyzing step, all interactions and links between the simulation systems 110, 320, 430 and between several source nodes 101 are determined. The respective interactions and links are mapped in the global operation graph 102.

Next, the simulation of the system including all simulation systems 110, 320, 430 is controlled e.g. by a control unit 401 on the basis of the global operation graph 102 for performing the simulation of the system. The respective simulation systems 110, 320, 430 can be conducted on separate simulation units 402, which may be for example client computers which are arranged in different locations and connected via a network to the control unit 401. The global operation graph 102 provides a map and a necessary path of interaction between the simulation systems 110, 320, 430 and with further external source nodes 101. The control unit 401 may control the simulation units 402 on the basis of the global operation graph 102. Hence, for an iteration of the operating procedure for simulation of the system, the subsequent steps of conducting the simulation can strictly follow the path of the global operation graph 102. It is not necessary to determined again all interactions between different simulation systems 110, 320, 430 and source nodes 101.

It should be noted that the term "comprising" does not exclude other elements or steps and the article "a" or "an" does not exclude a plurality. Also, elements described in association with different embodiments may be combined.

Implementation of the invention is not limited to the preferred embodiments shown in the figures and described above. Instead, a multiplicity of variants is possible which use the solutions shown and the principles according to the invention even in the case of fundamentally different embodiments.

List of reference signs:

101 source node
102 global operation graph
110 first simulation system
111 first simulation node, Run FEM Simulation
112 geometric CAD data
113 built simulation model
114 material parameters
115 initial simulation model 115
116 Formed Simulation Model
117 post processing
201 converting unit, simulation function
202 functional source
203 build simulation function
320 second simulation system
301 further source node, material parameters
302 structural vehicle model
303 adapt simulation model
304 formed simulation model
305 post processing
321 further simulation node (FEM Simulation)
401 control unit
402 simulation units
430 third simulation system
Ps source parameter
Psi source input parameter
Pi input parameter
Pa output parameter

The invention claimed is:

1. A computer-implemented method of generating a global operation graph, the method comprising:
   determining with a processor a source node comprising at least one source parameter, wherein the source node comprises a database stored in a computer-readable memory, the database comprising the source parameter and/or the source node comprises a simulation function for determining the source parameter on the basis of a source input parameter of the source node;

determining with the processor a first simulation system comprising at least one first simulation node;

wherein the first simulation node comprises at least one input parameter and at least one output parameter;

wherein the first simulation node comprises a simulation function for determining the output parameter on the basis of the input parameter of the first simulation node;

determining, with the processor whether the input parameter is available on the basis of the source parameter or not, wherein the source parameter comprises information about the input parameter of the first simulation node or at least delivers an information about how the input parameter can be determined on the basis of the source parameter, if the input parameter is available on the basis of the source parameter, building with the processor a global operation graph describing a link between the source node and the first simulation node for describing an operating procedure of the simulation of the system, determining with the processor a second simulation system, wherein the second simulation system comprises a second source node, wherein the second source node is a second simulation node of the second simulation system, wherein the second simulation node comprises at least one further input parameter and at least one further output parameter, wherein the second simulation node comprises a further simulation function for determining with the processor the further output parameter on the basis of the further input parameter indicative of the source parameter taken from the source node, wherein the further output parameter is used by the processor as an input parameter for the first simulation node of the first simulation system, such that a respective dependency and co-simulation of both simulation systems, is provided and mapped by the processor in the global operation graph such that the first simulation system and the second simulation system are conducted simultaneously.

2. The method according to claim 1, further comprising:
controlling with the processor a simulation system on the basis of the global operation graph for performing a simulation of the system.

3. The method according to claim 1, further comprising:
providing with the processor a converting unit configured for converting the source parameter of the source node to the input parameter of the simulation node.

4. The method according to claim 3,
wherein the converting unit transfers with the processor the source parameter to the input parameter by converting a format of the source parameter to a required format of the input parameter.

5. The method according to claim 3,
wherein the converting unit provides a transfer function for determining with the processor the input parameter on the basis of the source parameter and of a further source parameter.

6. A system of generating an operation procedure for a simulation of a mechatronic system, the system comprising:
a memory element
a processor in communication with the memory element, the processor configured to determine a source node comprising at least one source parameter;

determine a first simulation system comprising at least one first simulation node;

wherein the first simulation node comprises at least one input parameter and at least one output parameter;

wherein the first simulation node comprises a simulation function for determining the output parameter on the basis of the input parameter of the first simulation node;

determine, whether the input parameter is available on the basis of the source parameter or not, wherein the source parameter comprises information about the input parameter of the first simulation node or at least delivers an information about how the input parameter can be determined on the basis of the source parameter, and when the input parameter is available on the basis of the source parameter, build a global operation graph describing a link between the source node and the first simulation node for describing an operating procedure of the simulation of the system, determine a second simulation system, wherein the second simulation system comprises a second source node, wherein the second source node is a second simulation node of the second simulation system, wherein the second simulation node comprises at least one further input parameter and at least one further output parameter, wherein the second simulation node comprises a further simulation function for determining with the processor the further output parameter on the basis of the further input parameter indicative of the source parameter taken from the source node, wherein the further output parameter is used by the processor as an input parameter for the first simulation node of the first simulation system, such that a respective dependency and co-simulation of both simulation systems, is provided and mapped by the processor in the global operation graph such that the first simulation system and the second simulation system are conducted simultaneously.

7. A computer program product comprising instructions, which instructions when executed by a computer, cause the computer to:
determine a source node comprising at least one source parameter;

determine a first simulation system comprising at least one first simulation node;

wherein the first simulation node comprises at least one input parameter and at least one output parameter;

wherein the first simulation node comprises a simulation function for determining the output parameter on the basis of the input parameter of the first simulation node;

determine, whether the input parameter is available on the basis of the source parameter or not, wherein the source parameter comprises information about the input parameter of the first simulation node or at least delivers an information about how the input parameter can be determined on the basis of the source parameter, and when the input parameter is available on the basis of the source parameter, build a global operation graph describing a link between the source node and the first simulation node for describing an operating procedure of the simulation of the system, determine a second simulation system, wherein the second simulation system comprises a second source node, wherein the second source node is a second simulation node of the second simulation system, wherein the second simulation node comprises at least one further input parameter and at least one further output parameter, wherein the second simulation node comprises a further simulation function for determining with the processor the further output parameter on the basis of the further input parameter indicative of the source parameter taken from the source node, wherein the further output parameter is used by the processor as an input parameter for the first simulation node of the first simulation system, such that a respective dependency and co-simulation of both simulation systems, is provided and mapped by the processor in the global operation graph such that the first simulation system and the second simulation system are conducted simultaneously.

\* \* \* \* \*